Jan. 29, 1924.  
G. H. NASH  
1,481,923  
METHOD AND APPARATUS FOR LOCATING THE DIRECTION OF A SOURCE OF VIBRATION  
Filed Nov. 1, 1918
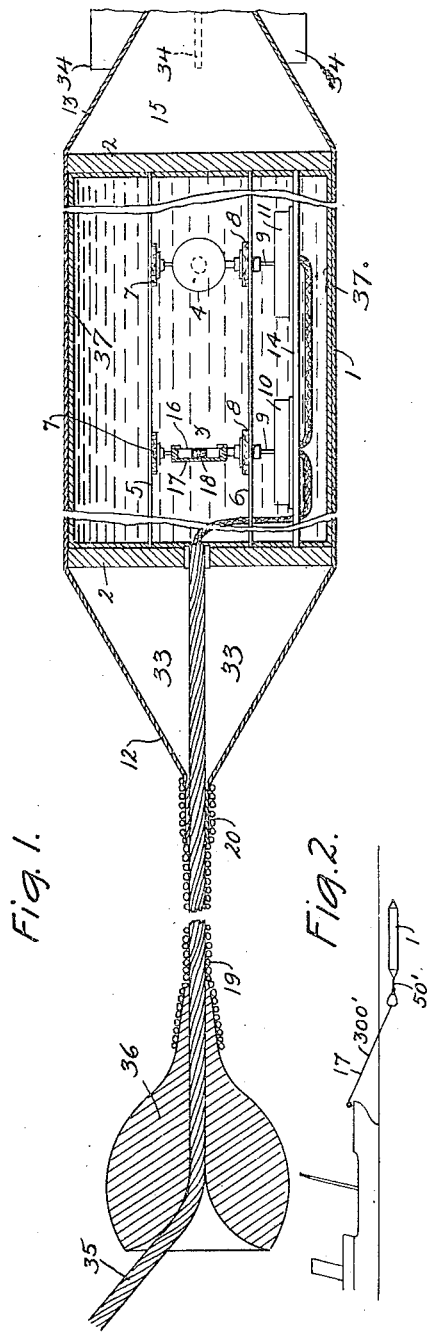
Fig.1.
Fig.2.
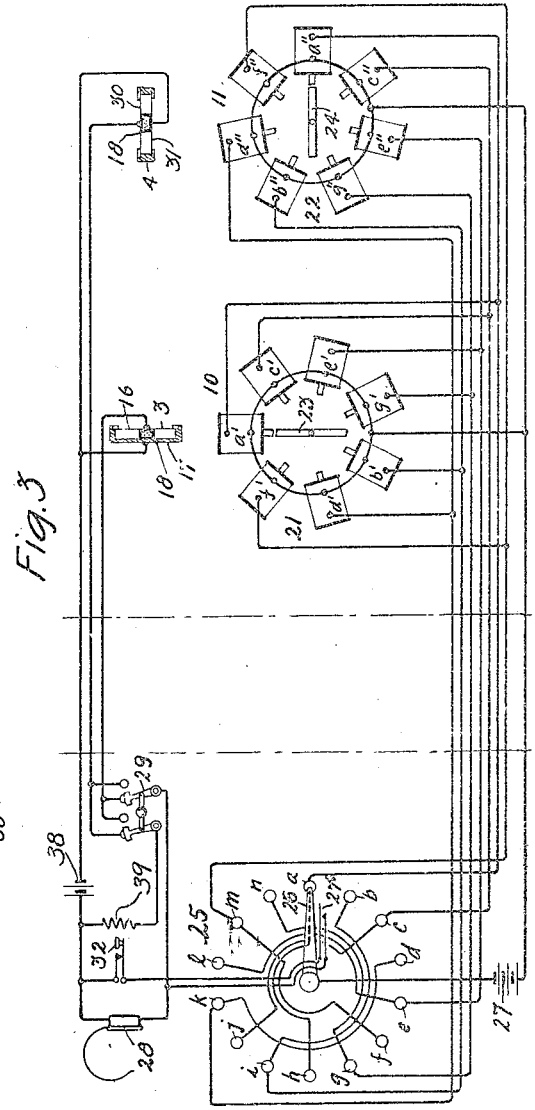
Fig.3.
Inventor:
George H. Nash
by J. E. Roberts Att'y.

Patented Jan. 29, 1924.

1,481,923

UNITED STATES PATENT OFFICE.

GEORGE H. NASH, OF HIGHBURY, LONDON, ENGLAND, ASSIGNOR TO WESTERN ELECTRIC COMPANY, INCORPORATED, OF NEW YORK, N. Y., A CORPORATION OF NEW YORK.

METHOD AND APPARATUS FOR LOCATING THE DIRECTION OF A SOURCE OF VIBRATION.

Application filed November 1, 1918. Serial No. 261,435.

*To all whom it may concern:*

Be it known that I, GEORGE HOWARD NASH, a subject of the King of Great Britain, residing at Highbury, London, England, have invented certain new and useful Improvements in a Method and Apparatus for Locating the Direction of a Source of Vibration, of which the following is a full, clear, concise, and exact description.

This invention relates to a method of and apparatus for detecting and determining the direction of a source of vibration such as sound.

It is an object of the invention to accurately determine the direction from a given observing point of a source of vibration such as is produced by an enemy craft, so that instrumentalities for disabling or otherwise dealing with such craft may be effectively directed against it.

In accordance with a feature of the invention the direction of a source of vibration is determined by synchronously rotating a plurality of vibration-responsive devices and comparing the effect of the vibrations on such devices in various positions. Also in accordance with this feature of the invention, the vibration-responsive devices are arranged to be rotated by synchronous motors under the control of an indicating member so arranged that for any given position of the apparatus the indicating member and the vibration-responsive devices will bear a certain definite directional relation, whereby the indicating member, in indicating the position of the vibration-responsive devices, will also indicate or point to the direction of the source of vibration.

In accordance with another feature of the invention, which renders the method and apparatus particularly applicable to the detection of enemy craft by an observer who is also located upon a moving vessel or vehicle, the vibration-responsive devices are arranged to be towed or otherwise maintained in spaced relation from the observing point, so that vibration incident to the movement of the observation point will have a minimum effect upon the vibration-responsive devices. In accordance with this feature of the invention, the vibration-responsive devices are supported by a float which is connected to the observing point by a cable including electric conductors over which the movement of the vibration-responsive devices may be controlled by the observer. In detecting submarine vessels, the vibration-responsive devices will ordinarily be mounted within a float or buoy which may be towed beneath the surface of the water.

These and other features of the invention will more clearly appear from the annexed specification and drawings in which Fig. 1 is a diagrammatic view, partly in section, of apparatus constructed in accordance with an embodiment of the invention designed for submarine use; Fig. 2 is a diagrammatic view showing the relation of the devices illustrated in Fig. 1 to a ship carrying the observer; and Fig. 3 is a diagrammatic view of the electric circuits utilized in controlling the device shown in Fig. 1.

In general, the device shown in Fig. 1 takes the form of an elongated float or buoy having substantially stream-line outlines which is arranged to be towed through the water and to be maintained below the surface of the water. Because of its similarity in outline to the ordinary fish, this device is commonly referred to by those utilizing it as a "fish," and for convenience will be so referred to in this specification.

The fish consists of a substantially cylindrical container indicated as a whole at 1, which is formed by supporting a piece of sheet metal upon a pair of formers 2. These formers may be made of wood or some light metal, and may be of any desired shape, preferably either circular or oval. The formers 2 and the sheet metal sheath supported thereon form a chamber within which are supported two sound-responsive devices 3 and 4. In the embodiment of the invention shown, a pair of parallel longitudinal members 5 and 6 are supported from the formers 2 and extend the entire length of the chamber. The chamber is of considerable length, the distance between the formers 2 being large compared to the distance between the sound-responsive devices 3 and 4. Mounted upon the member 5 are upper bearings 7, 7, and upon the member 6 the lower bearings 8, 8 in which are mounted for rotation the sound-responsive devices 3 and 4. Shafts 9, which are fixedly secured to the sound-responsive devices 3 and 4, are connected to the armatures of a pair of motors 10 and 11, which are supported upon a third parallel member 14 secured to the formers 2. The sound-responsive devices may be of any well-known type and preferably take the form of the ordinary microphone. As clearly shown in Figs. 1 and 3, the sound-responsive device 3 includes a diaphragm 16 mounted upon a casing 17 within which is included a microphone button or carbon chamber indicated at 18. The casing 17 is formed of some material which will either absorb or reflect sound waves and therefore prevents sound waves received from the side opposite that of the diaphragm from materially affecting the diaphragm. Therefore, the sound-responsive device 3 is shielded on one side from sound vibrations and is sensitive to sound vibrations received only on its diaphragm side. The sound-responsive device 4 differs from the sound-responsive device 3 only in that the shield or casing part 17 is replaced by another diaphragm, there being two oppositely disposed diaphragms 30 and 31, so that this sound-responsive device will respond to sound received from any direction, except in a direction parallel to the diaphragm; that is to say, when the sound-responsive device 4 is positioned with the edge of the diaphragms pointing in the direction of the source of sound, the diaphragms will not be affected.

Secured to the formers 2 are substantially conical projections 12 and 13, also of sheet metal, which form, together with the formers 2, air chambers indicated at 33 and 15. These air chambers serve to give buoyancy to the entire device. They are proportioned so that the chamber containing the sound-responsive devices may be filled with fluid and the whole device arranged to float at a given point beneath the surface. Mounted on the rear conical extension are a series of guiding fins 34, which serve to prevent rotation of the whole device when towed through the water. The towing is accomplished by means of a cable 35 which extends from the towing vessel through a weight 36, commonly called the "pilot fish," to the main fish 1. This cable also contains an electrical cable comprising a number of electrical conductors which are shown diagrammatically in Fig. 3. The pilot fish 36 may be made of lead or other suitable material which is provided with a passage through which the cable passes, which passage is so formed as to provide for a gradual bend of the cable. The function of the pilot fish is to maintain the main fish a suitable distance below the surface of the water by counteracting the towing pull, which would have a tendency to pull the main fish to the surface. The distance between the pilot fish and the main fish may be adjusted, as may also the weight of the pilot fish, so as to maintain the fish at a given distance below the surface of the water. In order to substantially prevent the transmission of vibration from the towing vessel through the cable to the main fish, the cable adjacent the pilot and main fish is surrounded by a spiral spring wire indicated at 19 and 20.

In constructing the main fish special precautions are taken to prevent interference or reflection of the sound waves intermediate the source and the sound-responsive devices. Thus the chamber containing the sound-responsive devices is filled with sea water to prevent sound refraction in passing from the surface of the fish to such devices. Also the various necessary partitions, supports and other apparatus within the fish are covered with rubber 37 or other sound deadening or absorbing material. The body of the fish is very elongated so that the conical ends thereof are located a comparatively great distance from the sound-responsive devices, so that such ends will not act as shields when the sound-responsive devices are directed toward the ends of the fish.

The synchronous motors for rotating the sound-responsive devices 3 and 4 are illustrated diagrammatically in Fig. 3 and comprise two groups of electromagnets 21 and 22 which operate upon the armatures 23 and 24 respectively. The two sound-responsive devices are normally set so that the plane of their diaphragms are at right angles to each other, and this relation is maintained at all times, since the armatures of the synchronous motors are connected to the sound-responsive devices, so that the axis of the armature is parallel to the plane of the diaphragm of the sound-responsive device driven thereby. The motors 10 and 11 are controlled by the controller 25 with which they are connected by means of the electric cable extending between the point of observation and the fish. This controller is provided with a plurality of stationary contacts $a$, $b$, $c$, $d$, $e$, $f$, $g$, $h$, $i$, $j$, $k$, $l$, $m$ and $n$, and a movable contact arm 26. Contacts $a$ and $h$ are electrically connected to each other and to the motor magnets $a'$ and $a''$. Similarly, contacts $b$ and $i$ are connected to magnets $b'$ and $b''$, contacts $c$ and $j$ to magnets $c'$ and $c''$, $d$ and $k$ to magnets $d'$ and $d''$ contacts $e$ and $l$ to magnets $e'$ and $e''$, contacts $f$ and $m$ to magnets $f'$ and $f''$, $g$ and $n$ to magnets $g'$ and $g''$. It will be apparent that as a result of these connections, since the arm 26 is connected to one side of a source of energy such as the battery 27, the other side of which is connected to a common conductor extending to each of the motor magnets, the rotation of the arm 26 will cause the magnets to be energized in the following order: $a'$, $b'$, $c'$, $d'$, $e'$, $f'$, $g'$ and $a''$, $b''$, $c''$, $d''$; $e''$, $f''$, $g''$. The energization of each successive magnet will move the armature one half step, so that the armature will make a complete rotation when each magnet has been energized twice, which will occur during each complete rotation of the arm 26. As indicated in Fig. 3 of the drawings, the armatures 23 and 24 are normally at right angles to each other as are also the sound-responsive elements 3 and 4 connected thereto. Since the correspondingly lettered motor magnets of each motor can only be simultaneously energized, the armatures are moved synchronously and this right angular relation is always maintained.

It is thought that the construction of the apparatus not specifically described above may be clearly understood from the following description of the operation.

It will be assumed that the fish and pilot fish are being towed behind a ship for the purpose of locating the presence of enemy submarines. Under these conditions the cable 35 will be approximately three hundred feet in length and the distance between the pilot and main fish will be approximately fifty feet. The main fish itself is in the neighborhood of ten or fifteen feet long and is approximately one and a half feet in diameter. Under the conditions assumed the main fish will be submerged a considerable distance below the surface and a considerable distance from the towing ship, so that the sound-responsive devices 3 and 4 will not be materially affected by the disturbance created by the propeller of the towing ship.

The observer on the towing ship being desirous of determining whether there is a submarine vessel in the vicinity will place the telephone receiver 28 to his ear and will throw the switch 29 to the right position.

It will be noted that the telephone receiver is operatively associated with a source of battery 38 and with either the microphones 3 or 4, depending upon the position of the switch 29. With the switch 29 in the position shown it will be observed that the microphone 3 and the telephone 28 are placed in series with the battery with each other and 38; whereas the microphone 4 is also connected to the battery, but through the resistance 39. This resistance 39 will be adjusted to be the equivalent of the resistance of the telephone receiver. Similarly, with the switch 29 thrown to the right, the microphone 4 will be connected in series with the telephone 28 and the microphone 3 in series with the resistance 39. The purpose of the resistance 39 is to insure that the same amount of current is flowing through the microphones regardless of whether they are cut in circuit with the telephone receiver. It has been demonstrated that the microphones operate at their highest point of sensitivity when they are heated to a certain degree, and consequently as shown in Fig. 3, current is always maintained flowing through the microphones regardless of whether or not they are associated with the telephone receiver, which current serves to maintain the microphones heated and at their maximum point of sensitivity.

Since the microphone 4 is responsive to sound received on either side owing to its double diaphragm construction, it is the more sensitive of the two microphones and will be usually used for detecting the presence of enemy submarines. Assuming, therefore, that switch 29 is thrown to the right, the observer will then listen. If there is an enemy submarine in the vicinity, unless the submarine should be located in a position so that the edge of the microphone 4 is pointing directly towards it, the sound, due to the operation of the machinery of the submarine, will be picked up by the microphone 4 and heard by the observer in the receiver 28. It is extremely unlikely that the microphone 4 will have its edge exactly in the line of propagation of sound, but in any case, the observer can explore by slowly rotating the handle 26 and both the microphones 3 and 4.

Mounted adjacent the arm 26 is a switch, the contacts of which are located at 27'. This switch is so arranged that while the arm 26 is in motion, the contact 27' is closed, thus closing a shunt across the receiver and preventing the listener from being confused by the clicking sounds which would otherwise be present in the receiver. This switch is particularly useful in a later stage of the operation and where its function will be more fully described.

Also included in the shunt circuit which passes through the contacts 27' is a key 32 which is normally closed. When exploring it is advantageous that the receiver 28 be operatively associated with the microphone during the rotation of the arm 26, and the key 32 provides means for disabling the shunt which will normally be closed about the receiver, due to the closure of contacts 27'. As soon as the presence of a submarine in the vicinity is indicated by a sound in the receiver 28, the observer proceeds to locate the direction of the submarine as follows. He will rotate the arm 26, maintaining key 32 depressed until a point is reached where no effect is audible in the receiver 28. This will indicate that an edge of the microphone 4 is pointed directly to the source of sound so that its diaphragms are not affected. Obviously, this indicates the direction of the line of propagation of the sound and does not indicate whether the arm 26 points directly towards the source of sound or directly away from it, since obviously there are two positions 180° apart where the diaphragms of the microphone 4 will be unaffected. To determine which of these two positions is correct, the observer will release the key 32 and throw the switch 29 to the left, and listen. He will then move the arm 26 through 180° during which movement of the arm the receiver will be shunted by the circuit including the contacts 27' and will compare the effect in his receiver at that point. Inasmuch as this comparison is very quickly made it can readily be determined in which of the two positions of the arm 26 the maximum effect is heard in the receiver. Since the microphone 3 is sound shielded on one side, the maximum effect in the receiver will be obtained when the unshielded or sensitive side is facing towards the source of sound. Inasmuch as the microphones 3 and 4 are moved synchronously with the arm 26, it is obvious that when the arm 26 is adjusted first to give the minimum or no result in the microphone 4 and then to produce a maximum result in the microphone 3, it will point directly to the source of sound, or in other words, to the submarine. The whole arrangement is therefore direct reading and the arm serves as a direct reading indicator.

It is obvious that the method of determining the direction of the source of sound as well as the apparatus disclosed herein may take a variety of forms and may be used for other purposes than the detection of under water craft.

What is claimed is:

1. Acoustic apparatus comprising a container, a plurality of vibration responsive elements mounted therein, means to maintain said vibration responsive elements at right angles to each other and to synchronously rotate said elements within said container, and means for translating the response of said elements into observable effects.

2. Apparatus for determining the direction of a source of vibrations comprising a vibration-responsive element having a pair of parallel diaphragms responsive to vibrations in all directions except vibrations propagated along lines parallel to the plane of the surfaces of said diaphragms, a second vibration-responsive element having a diaphragm responsive to vibration propagated from points facing said diaphragm, means for synchronously rotating said elements, and means for translating the response of said elements into observable effects.

3. Apparatus for determining the direction of a source of vibration comprising a container, a pair of vibration responsive elements mounted in said container with their responsive surfaces substantially at right angles, means for synchronously varying the position of said elements within said container, means for indicating at a distant point the position of said elements, and means for translating the response of said elements into observable effects.

4. Apparatus for determining the direction of a source of vibrations comprising a vibration responsive element shielded on one side from vibrations, a second vibration responsive element, responsive equally to vibrations from opposite sides, means for synchronously rotating said elements and maintaining them at right angles to each other, and means for translating the response of said elements into observable effects.

5. Apparatus for determining the direction of a source of vibrations comprising a plurality of vibration responsive elements mounted for rotation, electrical means to control the rotation of said elements, means to translate the response of said element into observable effects, and means at a distant point to indicate the position of said elements.

6. Apparatus for determining the direction of a source of subaqueous vibration comprising a submergible buoyant body, a towing ship for said body, a towing cable having one end attached to said ship and the other end attached to said buoyant body, vibration responsive devices rotatably mounted in said body, means to rotate said vibration responsive devices, means for translating the response of said devices into observable effects, means located on said towing ship to indicate the position of said devices, electrical conductors associated with said cable for connecting said responsive devices to said translating means, and a mass secured to said cable intermediate the towing ship and the buoyant body to compensate for the upward pull of the towing ship of said buoyant body.

7. Apparatus for determining the direction of a source of vibration comprising a pair of microphones, a source of current associated with said microphones, a telephone receiver in circuit with said course of current and one of said microphones, a resistance in circuit with said source of current and the other of said microphones, and means for interchanging said receiver and said resistance.

In witness whereof, I hereunto subscribe my name.

G. H. NASH.